United States Patent
Jiang et al.

(10) Patent No.: US 9,015,851 B2
(45) Date of Patent: Apr. 21, 2015

(54) ELECTRONIC BOOK CONTENT PROTECTION

(75) Inventors: Xin Jiang, San Ramon, CA (US); Shawn Brenneman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/453,146

(22) Filed: Apr. 23, 2012

(65) Prior Publication Data
US 2013/0283384 A1  Oct. 24, 2013

(51) Int. Cl.
*G06F 21/10* (2013.01)
*G06F 21/62* (2013.01)

(52) U.S. Cl.
CPC ............ *G06F 21/10* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,526,511 B1 * | 2/2003 | Urano et al. | 713/190 |
| 6,782,509 B1 * | 8/2004 | Hirayama et al. | 715/210 |
| 8,130,746 B2 * | 3/2012 | Schrempp | 370/351 |
| 2002/0143520 A1 * | 10/2002 | Gauthier et al. | 704/1 |
| 2003/0204727 A1 * | 10/2003 | Sasaki | 713/176 |
| 2004/0190181 A1 * | 9/2004 | Hikosaka et al. | 360/69 |
| 2009/0282062 A1 * | 11/2009 | Husic | 707/100 |
| 2011/0219455 A1 | 9/2011 | Bhagwan et al. | |
| 2011/0283363 A1 * | 11/2011 | Verschoor et al. | 726/26 |

FOREIGN PATENT DOCUMENTS

| | | |
|---|---|---|
| GB | 2443093 A | 4/2008 |
| WO | WO 2009/154564 A1 | 12/2009 |

OTHER PUBLICATIONS

European Search Report, European Application No. 13161954.6, Feb. 19, 2015, 7 pages.

* cited by examiner

*Primary Examiner* — David Le
(74) *Attorney, Agent, or Firm* — Fenwick & West LLP

(57) ABSTRACT

A system and method are disclosed for protecting an electronic book from unauthorized access. HTML for the book is shredded by dividing it into portions, and a selection scheme is used to intersperse decoy data among the portions. Dynamically generated cascading style sheets are used to define a pattern for decoy and content data such that a browser on a client device correctly processes the HTML but an unauthorized program such as a web scraper cannot correctly process the HTML.

23 Claims, 6 Drawing Sheets

ELECTRONIC BOOK CONTENT PROTECTION

BACKGROUND

1. Technical Field

The disclosure generally relates to the field of electronic books, and more specifically to the protection of electronic book content from unauthorized copying.

2. Background Information

Electronic book readers implemented either as use-specific devices, or as software on personal computers, tablet computers and smartphones have become extremely popular. As more and more books are being sold in electronic form, a concern has arisen regarding how best to protect those books from unauthorized copying.

One known technique for presenting an electronic book is via a web browser using hypertext markup language (HTML). An advantage of such a system is that most modern computers are already equipped with hardware and software to process HTML content, such as web browsers (e.g., the Chrome™ browser provided by Google Inc.). HTML is a flexible and easy-to-use language, so numerous electronic book features can be implemented with existing HTML tools.

One downside of using HTML, however, is that there are also many known technologies that could readily be applied to circumvent technological measures to protect an electronic book from piracy.

For example, even though an electronic book reader application might require a password for access to a library of books, once such authorization has been applied a user may nonetheless be able to copy portions of the book for unauthorized further use or resale. Specifically, a number of application programs variously known as "screen scrapers," "content scrapers," "data scrapers" or "web scrapers" (referred to generically as "scrapers" herein) capture HTML pages automatically and can readily be applied to copy and paste pages from an electronic book to quickly create an unauthorized copy of the book. Thus, it would be advantageous to provide a mechanism for protecting HTML-based electronic book content from such unauthorized use.

SUMMARY

A system, method and computer readable storage medium is disclosed for protecting content data from unauthorized access by a user of a computer on which the content data are processed. In one aspect, a manner is selected for dividing the content data into a number of sections, the manner not being stored in a way evident to the user. The content data are shredded into the plurality of sections and obfuscated by interspersing plural portions of decoy data (sometimes also referred to as "garbage" data) among the plurality of sections.

In another aspect, the interspersing is performed responsive to a selected pattern. In yet another aspect, HTML tags are used to define the plurality of sections. In still another aspect, the selected pattern is implemented using dynamically generated cascading style sheets. In a related aspect, the dynamically generated cascading style sheets are implemented by processing JavaScript.

The selected pattern is, in some aspects, a plurality of bits. The selecting includes, in some aspects, flipping a subset of the bits in a way not evident to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features that will be more readily apparent from the detailed description, the appended claims, and the accompanying figures. A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. For convenience and in order to aid readability the described embodiments and claims refer to the specific text to be protected as an electronic book. It should be understood that this is intended to encompass all forms of digital text, including, but not limited to; electronic books, electronic magazines, electronic newspapers, and any other such entity which includes content displayed on an electronic reading device.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Machine Architecture

Figure 1:
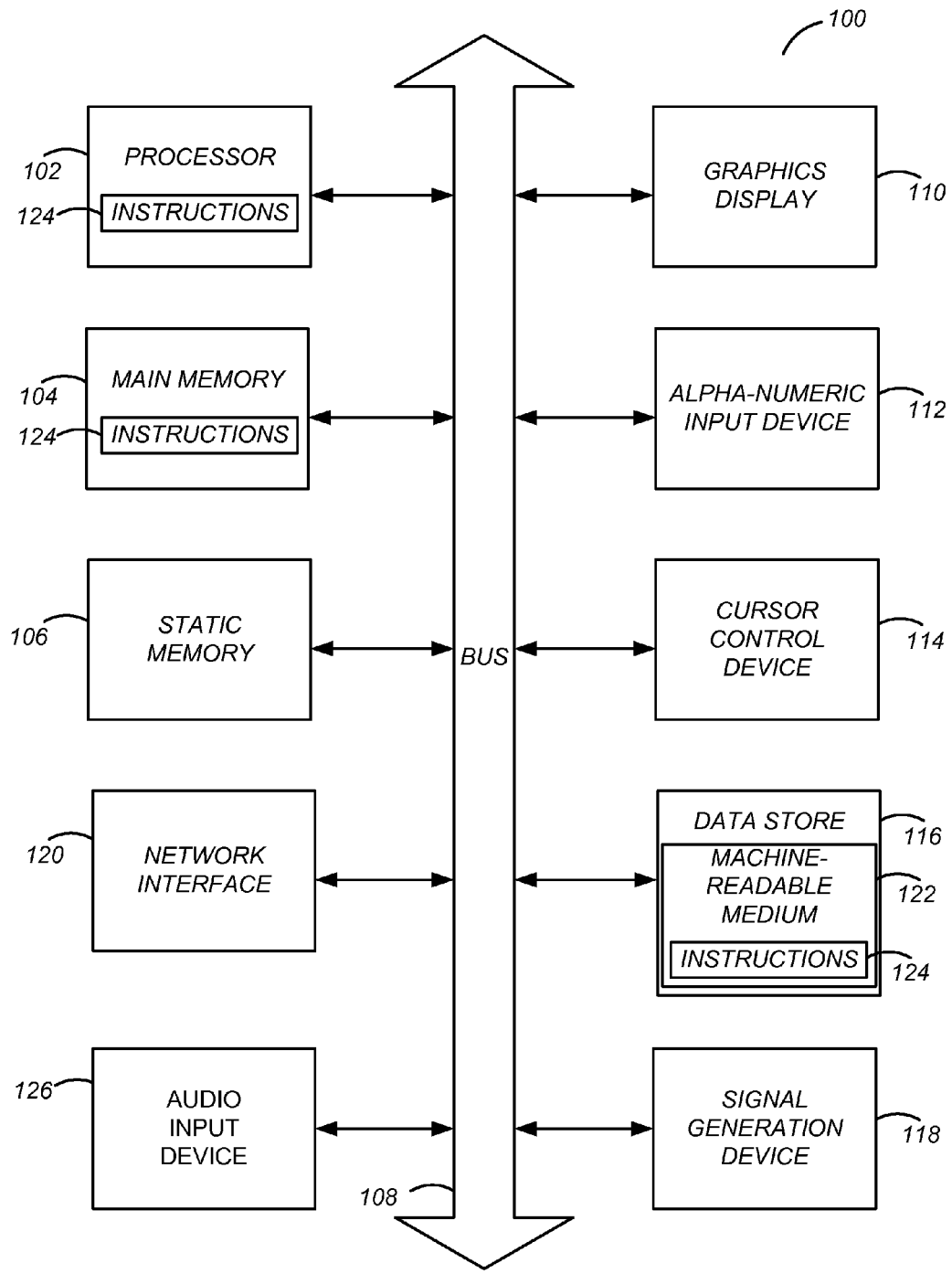
FIG. 1 illustrates one embodiment of components of an example machine able to read instructions from a machine-readable medium and execute them in a processor.

FIG. 1 is a block diagram illustrating components of an example machine able to read instructions from a machine-readable medium and execute them in a processor. Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a data store 116, a signal generation device 118 (e.g., a speaker), an audio input device 126 (e.g., a microphone) and a network interface device 120, which also are configured to communicate via the bus 108.

The data store 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network (not shown) via a network interface 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Configuration Overview

Figure 2:
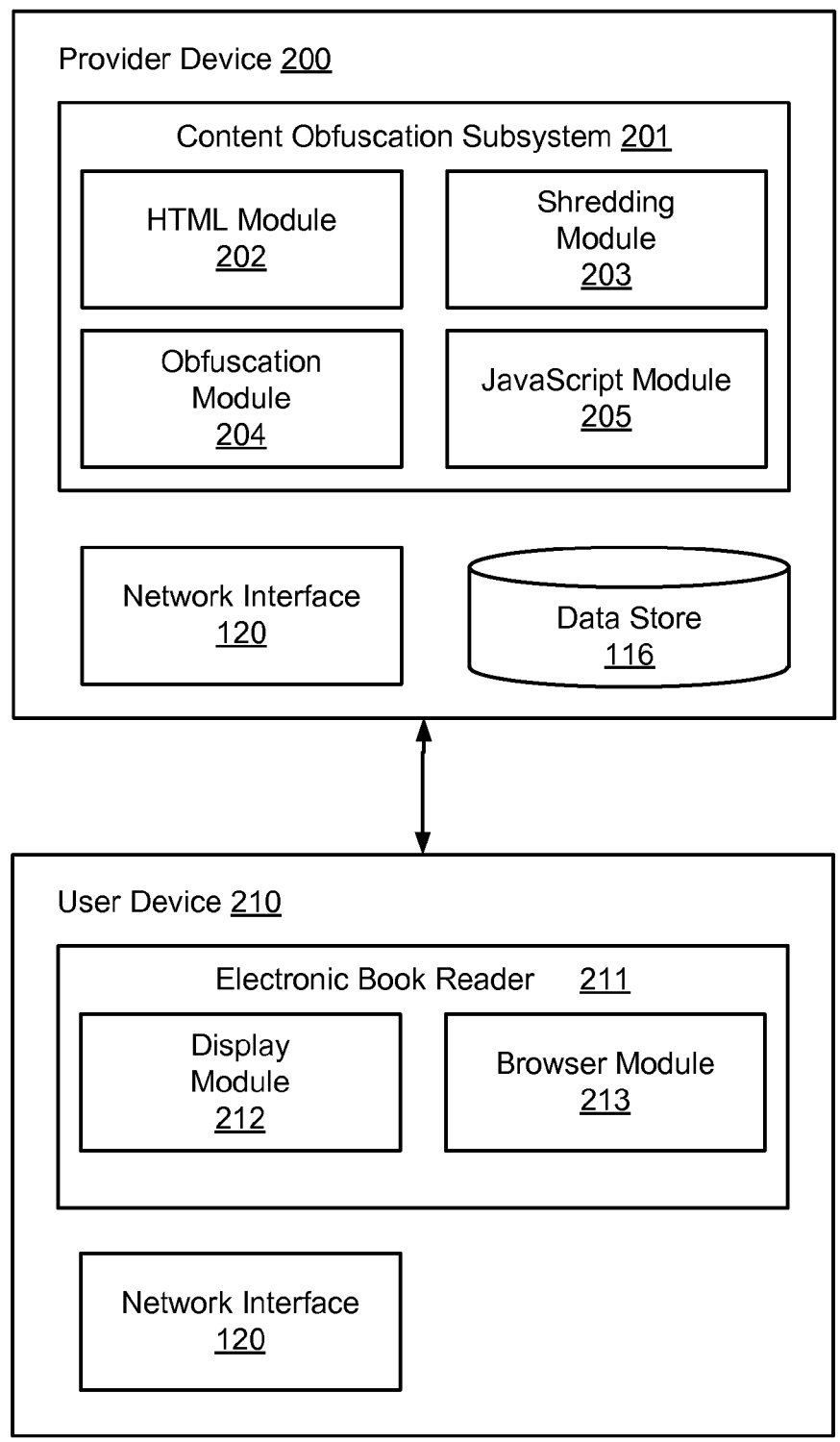
FIG. 2 is a high-level diagram illustrating a provider device and a user device in accordance with one embodiment.

FIG. 2 is a high-level diagram illustrating a provider device 200 and a user device 210 configured to protect electronic book data from screen scraping in accordance with some embodiments. The provider device 200 includes a content obfuscation subsystem 201 with an HTML module 202, a shredding module 203, an obfuscation module 204 and a JavaScript module 205. The operation of these components is described below. The provider device 200 further includes a network interface 120 for communication with user device 210 (e.g., via the Internet) and data store 116 in which is stored, for example, data corresponding to an electronic book.

The user device 210 includes an electronic book reader 211 and a network interface 120 (for communication with provider device 200, e.g., via the Internet). The electronic book reader 211 includes in the embodiment shown a display module 212 and a browser module 213. The operation of these components is described below.

In one embodiment, an electronic book is stored at provider device 200 in data store 116. In this embodiment, HTML corresponding to the book is prepared at provider device 200 and served to the user device 210 as described herein. Thus, provider device 200 acts as a server and user device 210 acts as a client. However, it should be recognized that in other embodiments, the electronic book data may be stored locally at user device 210, and the HTML to allow display of the electronic book may be likewise generated locally at user device 210 as described herein. One specific method by which the electronic book is obtained is via network interface 120, which enables the user device 210 to interact with online book vendors and repositories such as GOOGLE PLAY™, GOOGLE™ PLAY BOOKS, GOOGLE BOOKS™ and GOOGLE EBOOKSTORE™. Alternatively, the electronic book can be copied from portable computer readable media such as a flash drive, compact disc (CD) or digital versatile disc (DVD).

In some environments, the display of text on the display module of an electronic book is accomplished using HTML. HTML allows, via simple delimiters or tags, application of various font sizes, styles, colors, placements and the like to provide a pleasing display of text and graphical elements of a book to users. As shown in FIG. 2, electronic book reader 211 includes a display module 212 and a browser module 213. Many computers have general purpose display functionality, implemented by both software and hardware, that allows display of data from various sources; these components are referred to as display module 212. For clarity, browser module 213 is separately illustrated to emphasize that such computers often are equipped with one or more browser programs that retrieve data, for instance from a web page, and prepare it for display, for instance on electronic book reader 211 using display module 212. In other embodiments, the functions of display module 212 and browser module 213 may be allocated in various ways or the two modules may, generally speaking, be implemented as a unitary subsystem.

In many embodiments, electronic book reader 211 is further provided with access control mechanisms, such as password controls, to limit access to electronic book content to those who have purchased access rights. Often, such mechanisms prevent the aforementioned HTML content from being sent to browser module 213 unless access rights have been confirmed, such as by entry of a recognized password. However, once a user has obtained access, and HTML is being provided to browser module 213 and display module 212 to present the contents of a book to a user, there is typically some loss of control over the content. For example, if the user device is a personal computer, simple keyboard commands such as ALT-PrtScn effectively capture the image of a computer window and can copy that content to another program. More sophisticated application programs, such as scrapers, automatically capture information that is intended for display to a user rather than for use by another program and make such data available for other types of uses. One example of such a use is copying an electronic book.

It has long been known that simply copying data sent to a device such as browser module 213 yields results that may not be what is desired. Where such data are in HTML format, for example, treating the data as plain text yields delimiters and display instructions that do not correspond to the actual content of the book. For example, the first page of a book may include a chapter name, a chapter number, a decorative drop cap to begin the text of the chapter, and body text to continue the text of the chapter. Each of these elements may be bracketed by HTML elements such as start tags, end tags, and the like. As a common example, the pair <p> and </p> are used to denote a paragraph.

More sophisticated layouts are achievable using a structure known as a document object model, or DOM, that can be used to organize electronic documents for display through, for example, manipulation of cascading style sheet, or CSS, properties. Thus, what may appear to a user to be a simple text sentence in an electronic book may be represented in HTML in a far more complex manner.

Even so, modern scrapers can process typical HTML content and readily remove or translate various formatting elements as needed, for instance to cleanly present a copied portion of a web page in a word processing application. In some environments this is desirable, but for electronic books the result can be that one person purchasing rights to read an electronic book can readily copy that book to another format for resale or some other, unauthorized, use. For instance, an open source software tool known as Firebug includes DOM tree explorer features that allow HTML content to be copied readily from an original browser to other media.

To address this potential concern for electronic books, attempts have been made to provide HTML that appears when presented via browser module 213 (e.g., a web browser) to be the clean text of a book but when captured via a scraper is not readily converted into clean text for other media. Preferably, such a mechanism does not require specialized software (e.g., "plug-ins") and operates universally among supported browsers.

In one embodiment, this is accomplished by shredding module 203 and obfuscation module 204 on content obfuscation subsystem 201 of provider device 200. Specifically, shredding module 203 takes a portion of HTML (such as the native HTML content generated by HTML module 202 of a book kept in data store 116) and breaks it up into smaller constituent elements. Obfuscation module 204 then intersperses non-visible or "decoy" HTML elements between each adjacent pair of the smaller elements. In some embodiments, JavaScript module 205 further provides, upon request from browser module 213, a key to dynamically create CSS as described below. When presented to display module 212 for display to the user, the resulting data appear as the clean text of the electronic book, but when captured by typical scrapers, the garbage elements are difficult to remove, thus raising the effort required to make an unauthorized copy of the contents of the book.

To add another level of protection, content obfuscation subsystem is configured to dynamically select parameters that are used in operation of shredding module 203, obfuscation module 204, or both. Such operations can be considered to provide a "selector" module (not shown) of content obfuscation subsystem 201, whether actually implemented as part of shredding module 203, obfuscation module 204, JavaScript module 205 or otherwise. By changing such properties over time, it becomes even more difficult for a scraper to figure out how to decode the HTML being sent to browser module 213.

To further explain operation of electronic book reader 210 as set forth herein, consider the following example. A piece of "native" (i.e., unprotected) HTML content may appear as follows:

```
<html>
<body>
<p>When you have new buzz, you'll see a count next to the label in Gmail
(just like you would with new Gmail messages in your inbox).</p>
</body>
</html>
```

While there are some tags in this example, it would be a fairly simple programming exercise for a provider of a scraper to process the extremely common HTML elements so that they are essentially ignored in the process of capturing the substance of the content. As mentioned above, shredding can make it somewhat more difficult for a web scraping program, as an example of the same content shredded below shows:

```
<html>
<body>
<p>
<span>Whe</span><span>n y</span><span>ou </span><span>hav</span><span>e
n</span><span>ew </span><span>buz</span><span>z, </span><span>you</
span><span>'ll</span><span> se</span><span>e a</span><span> co</
span><span>unt</span><span> ne</span><span>xt </span><span>to </
span><span>the</span><span> la</span><span>bel</span><span> in</span><span>
Gm</span><span>ail</span><span> (j</span><span>ust</span><span> li</
span><span>ke </span><span>you</span><span> wo</span><span>uld</span><span>
wi</span><span>th </span><span>new</span><span> Gm</span><span>ail</
span><span> me</span><span>ssa</span><span>ges</span><span> in</span><span>
yo</span><span>ur </span><span>inb</span><span>ox)</span><span>.</span>
</p>
</body>
</html>
```

The "span" tag in HTML merely indicates a logical grouping of the enclosed elements, which in this instance does not indicate any change in actual processing. It does, however, impose an additional burden on any web scraping program that would seek to capture the content of this text, namely such a program would need to actually process the large number of tags to extract the meaningful content that they mark.

To further burden a scraper, obfuscation module 204 adds additional HTML to the content, for instance:

```
<html>
<head>
<style type="text/css">
o:nth-child(2n) { display:none }
</style>
</head>
<body>
<p>
<o>Whe</o><o>abc</o><o>n y</o><o>abc</o><o>ou </o><o>abc</o><o>hav</o><o>abc</o><o>e n</o><o>abc</o><o>ew </o><o>abc</o><o>buz</o><o>abc</o><o>z, </o><o>abc</o><o>you</o><o>abc</o><o>'ll</o><o>abc</o><o> se</o><o>abc</o><o>e a</o><o>abc</o><o> co</o><o>abc</o><o>unt</o><o>abc</o><o>ne</o><o>abc</o><o>xt </o><o>abc</o><o>to </o><o>abc</o><o>the</o><o>abc</o><o> la</o><o>abc</o><o>bel</o><o>abc</o><o> in</o><o>abc</o><o> Gm</o><o>abc</o><o>ail</o><o>abc</o><o> (j</o><o>abc</o><o>ust</o><o>abc</o><o>li</o><o>abc</o><o>ke </o><o>abc</o><o>you</o><o>abc</o><o> wo</o><o>abc</o><o>uld</o><o>abc</o><o> wi</o><o>abc</o><o>th </o><o>abc</o><o>new</o><o>abc</o><o> Gm</o><o>abc</o><o>ail</o><o>abc</o><o> me</o><o>abc</o><o>ssa</o><o>abc</o><o>ges</o><o>abc</o><o> in</o><o>abc</o><o> yo</o><o>abc</o><o>ur </o><o>abc</o><o>inb</o><o>abc</o><o>ox)</o><o>abc</o><o>.</o><o>abc</o>
</p>
</body>
</html>
```

Here, a CSS property ("display") is used to control which portions of text are actually displayed and which are not. Specifically, the line "o:nth-child(2n) {display:none}" means that only every other group of text bracketed by an <o> </o> pair is to be displayed. Thus, browser module 213 processing the HTML will display "Whe" and "n y" while ignoring "abc". The "display" property is only one example of a control that is usable in this manner and other choices are possible, such as absolute positioning choices that would present text at a specified location (which might be off the page of the browser window, e.g., −9999px) or color (which might be transparent) to achieve a similar result. In addition, the decoy text that is inserted in this example is always the same ("abc") but in some embodiments is dynamically or even randomly generated to make it yet more difficult for a scraper to identify it as decoy data. More information about how DOM, CSS and HTML operate is available from various sources known to those of skill in the art, for instance from the World Wide Web Consortium (W3C) website. One such reference is at: http://www.w3.org/standards/webdesign/htmlcss, a page that also provides links to various related tutorials.

While this approach makes the output of a generalized scraper essentially unusable for capturing the original content, it still does not pose tremendous difficulty for those intent on copying such content because the scheme for shredding and obfuscating are clearly evident from the HTML itself. Thus, a programmer can easily write a feature into a scraper to process these tags so as to retrieve the original content.

To make it yet more difficult for automated retrieval of the original content, static CSS such as "o:nth-child(2n) {display:none}" is replaced with dynamic CSS generated in some embodiments by obfuscation module 204 in a manner that makes it difficult to parse or guess the sequence of the original content. In further embodiments, JavaScript module 205 further directs the manner of such dynamic CSS generation.

Specifically, the type of tag that is being used for decoy data and the position of the decoy data are both parameters that can be manipulated for this purpose. In one example, the actual tag used is randomly selected from a group of available tags that would not otherwise impact display on the user device 210 via display module 212, so that in addition to the <o> </o> pair used in the example above, randomly selected pairs such as <a> </a>, <b> </b>, <i> </i>, <s> </s> and the like can also be used as "wrappers" for data (so long as they are not otherwise specified for other purposes in the HTML processing).

Another parameter usable to thwart scraping is the positioning of real and decoy data. The n-th child function shown in the example above is one possibility; in other embodiments other techniques known to those skilled in HTML are usable as well. Multiple CSS selectors are used in some embodiments such that one selector overrides a predecessor selector, such that a set of selectors maps various incoming positions to outgoing positions. When properly processed, all of the decoy data is marked as "display: none" so that it does not appear on electronic book reader 211, while all of the real data will appear (i.e., be marked appropriately as, for instance, "display: inline").

Positioning of real and decoy data is made still more difficult to determine if obfuscation module 204 randomly assigns patterns of real and decoy data. As an example, in one embodiment a pattern size of 16 chunks is used, with each chunk being either real data ("R") or decoy data ("G"). One such pattern would then be:

| 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|
| R | G | R | G | R | G | G | R | G | R | G | R | G | G | R | G |

If a 1 is used to represent real data and a 0 is used to represent decoy data, a corresponding 16 bit long bitmap is 0xA952 or b1010100101010010.

The visibility of the above pattern is in one embodiment implemented by the following selectors:

```
o:nth-child(16n+1) { display:inline; }
o:nth-child(16n+2) { display:hidden; }
o:nth-child(16n+3) { display:inline; }
o:nth-child(16n+4) { display:hidden; }
o:nth-child(16n+5) { display:inline; }
o:nth-child(16n+6) { display:hidden; }
o:nth-child(16n+7) { display:hidden; }
o:nth-child(16n+8) { display:inline; }
o:nth-child(16n+9) { display:hidden; }
o:nth-child(16n+10) { display:inline; }
o:nth-child(16n+11) { display:hidden; }
o:nth-child(16n+12) { display:inline; }
o:nth-child(16n+13) { display:hidden; }
o:nth-child(16n+14) { display:hidden; }
o:nth-child(16n+15) { display:inline; }
o:nth-child(16n) { display:hidden; }
```

Not only is this one-by-one approach very slow to parse on a client-side browser, it is rather easy for a scraper to parse by writing some regular expression (i.e., without the need for a full CSS processing engine). Again, however, it is preferable that a scraper not be able to tell that this particular selector scheme is being used, since if the scheme is known, corresponding simple programming can be used to process in accordance with this scheme to retrieve the original content. To obfuscate the position selectors, in one embodiment obfuscation module 204 applies incremental CSS rules, such that one rule overrides a previous rule, and does so in a way that can be properly decoded at browser module 213 because a full CSS processing engine is provided for such decoding. As a practical matter, the resulting HTML is essentially not able to be decoded using the simple processing modules that typically exist in scrapers. In this instance, a difference between true CSS processing and simpler approaches is that a true CSS processing engine maintains an imperative state of the current element's CSS property when it performs rule selection, thus making processing of incremental rules possible.

In one specific embodiment, a bit flip approach is used that changes the pattern of real and decoy data as follows. First, assume initially that the beginning bitmap is simple in that each bit represents real content, i.e., 1111111111111111. For this illustrative embodiment, four rounds of obfuscation are applied, as follows: 2n+i (0<=i<2), 4n+j (0<=j<4), 8n+k (0<=k<8), 16n+l (0<=l<16), where we randomly pick i=1, j=3, k=7, l=9. Processing then proceeds as follows:
In the first round all 2n+1 bits are set to be hidden:
0 1 0 1 0 1 0 1 0 1 0 1 0 1 0 1
In the second round all 4n+3 bits are set to be shown:
0 1 1 1 0 1 1 1 0 1 1 1 0 1 0 1
In the third round all 8n+7 bits are set to be hidden:
0 1 1 0 0 1 0 1 0 1 1 1 0 1 0 1
Finally, in the fourth round all 16n+9 bits are set to be shown:
0 1 1 0 0 1 0 1 1 1 1 1 0 1 0 1

This last bitmap indicates that on the server side, real content is placed in all bits that are 1, decoy data is placed in all bits that are 0. Then, the sample output served to a browser from the server would be:

```
<html>
<head>
<style type="text/css">
o:nth-child(2n+1) { display : none; }
o:nth-child(4n+3) { display : inline; }
o:nth-child(8n+7) { display : none; }
o:nth-child(16n+9) { display : inline; }
</style>
</head>
```

```
<body>
<o class="content">g1</o>
<o class="content">c2</o>
<o class="content">c3</o>
<o class="content">g4</o>
<o class="content">g5</o>
<o class="content">c6</o>
<o class="content">g7</o>
<o class="content">c8</o>
<o class="content">c9</o>
<o class="content">c10</o>
<o class="content">c11</o>
<o class="content">c12</o>
<o class="content">g13</o>
<o class="content">c14</o>
<o class="content">g15</o>
<o class="content">c16</o>
</body>
</html>
``` with "c" indicating real content and "g" indicating decoy (or "garbage") data. If this HTML were inserted into a conventional browser (e.g., the Chrome™ browser provided by Google Inc.) it would show only the content tags and not the decoy tags, because the browser correctly executed the CSS rules per the style sheet at the top of the HTML. However, a typical web scraper would not be able to correctly execute these CSS rules.

As an additional layer of protection, in some embodiments the CSS that is initially sent from the server computer to the client computer is further processed before the client's browser applies it to the obfuscated content. Specifically, when the page is loaded, JavaScript code calls upon user device 210 (the client) to obtain from JavaScript module 205 at provider device 200 (the server) a random key (e.g., one of the randomly generated bitmaps mentioned above). In a further embodiment, this key is encrypted at the server and decrypted, using standard JavaScript techniques known to those skilled in the art, at the client. The JavaScript then uses the bitmap to dynamically construct the CSS. In this manner, additional further levels of protection are added that make it difficult for a scraping processor that is not a robust browser capable of complex CSS and JavaScript processing to differentiate the real content from the decoy content.

In the embodiment illustrated in FIG. 2, the electronic book reader 211 is software running on the user device 210 that configures the user device 210 to display and manipulate electronic books stored as one or more data files in the remote data store 116 via the network interfaces 120. In other embodiments, such book data are accessed locally from storage (not shown) on user device 210. The browser module 213 processes electronic book data files responsive to user selection of a specific electronic book and presents the content described therein to the user via the display module 212 of the user device 210.

Systems and methods by which the above functionality can be provided are described in greater detail below with reference to specific embodiments.

Obfuscation Processing

Figure 3:
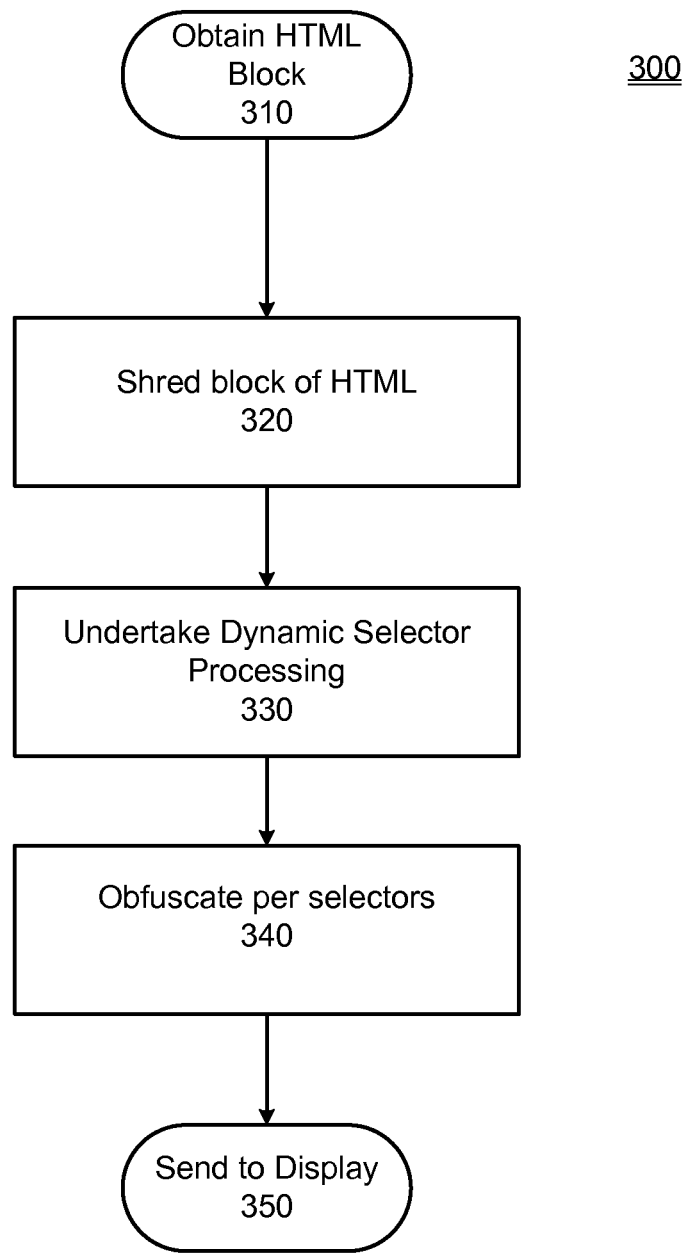
FIG. 3 is a flow chart illustrating an exemplary process for obfuscation of HTML in one embodiment.

FIG. 3 is a flow chart illustrating the high-level steps of a method 300, used in exemplary embodiments, for obfuscating HTML of an electronic book. The method begins by obtaining a portion of HTML content for processing, for instance from data store 116 (step 310). Next, in step 320 the HTML block is shredded as described above to break it into smaller segments of data among which decoy data can be juxtaposed. In some embodiments, the real and decoy data segments are of a fixed size while in others they are both dynamically sized to make distinction between decoy data and real data more difficult for a scraper.

Next, in step 330, dynamic selector processing is undertaken as detailed above. In various embodiments, different types of CSS selectors are created and nested in manners difficult for a general purpose web scraper to correctly interpret, such as via the bit-flipping described above.

Next, in step 340, the HTML content is obfuscated in accordance with the selectors, yielding an HTML block that intersperses real data and decoy data according to a selector scheme that can be processed by an authorized display device (e.g., display module 212 and browser module 213) but not by a scraper interpreting the HTML. Finally, in step 350, the HTML is sent to the display device for presentation of the content to the user.

It should be noted that in some implementations, shredding and obfuscation via selectors may be largely independent processes, with shredding merely defining where to break up the original data and obfuscation determining what to insert between segments of the original data. In other implementations, it may make sense for one process to be undertaken before the other, and the shredding and obfuscation functions may be more tightly coupled and integrated. Any manner of interspersing real and decoy data in a way that is straightforward for an expected browser processor (i.e., a "target" browser) to interpret but difficult for an expected scraper processor (i.e., a "target" scraper) to interpret can provide helpful results, with the specific implementation chosen as appropriate for the environment of use (e.g., simpler schemes for less sophisticated user devices and lower concerns about piracy).

Figure 4:
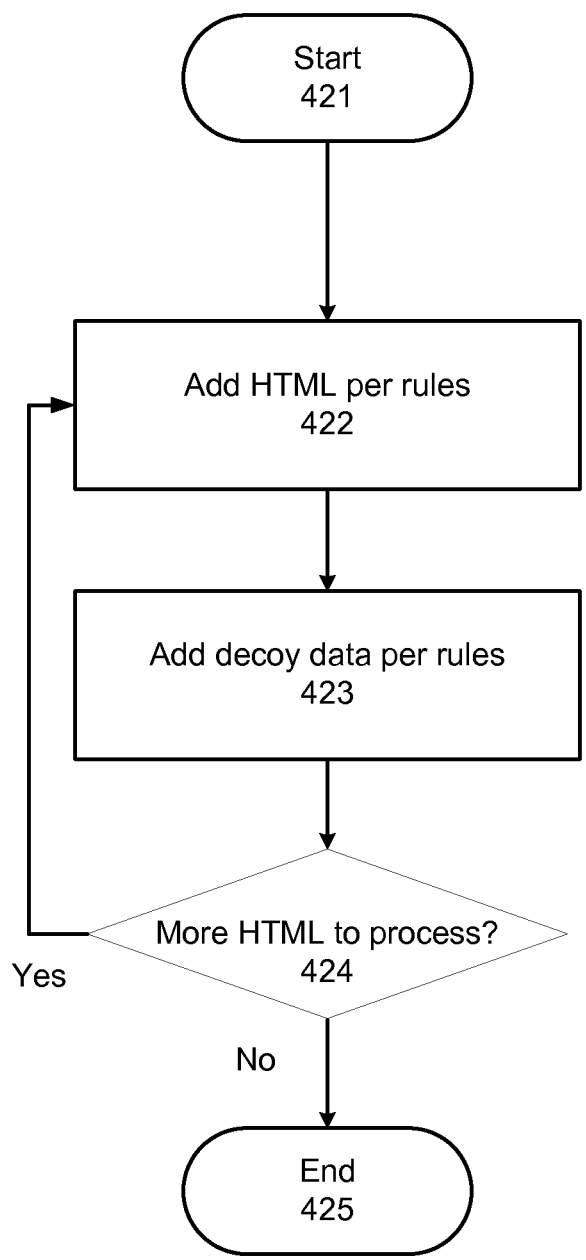
FIG. 4 is a flow chart illustrating in further detail the shredding step of FIG. 3.

FIG. 4 illustrates an exemplary process 400 for shredding (e.g., as in step 320 of FIG. 3) in one embodiment. After the process 400 is invoked in step 421, a portion of HTML is added to a string of data in step 422 according to the corresponding rules, e.g., those discussed above. Next, a portion of decoy data is then added in step 423, again per the corresponding rules discussed above. If there is more HTML to process, in step 424 processing is returned to step 422; otherwise processing ends in step 425.

Figure 5:
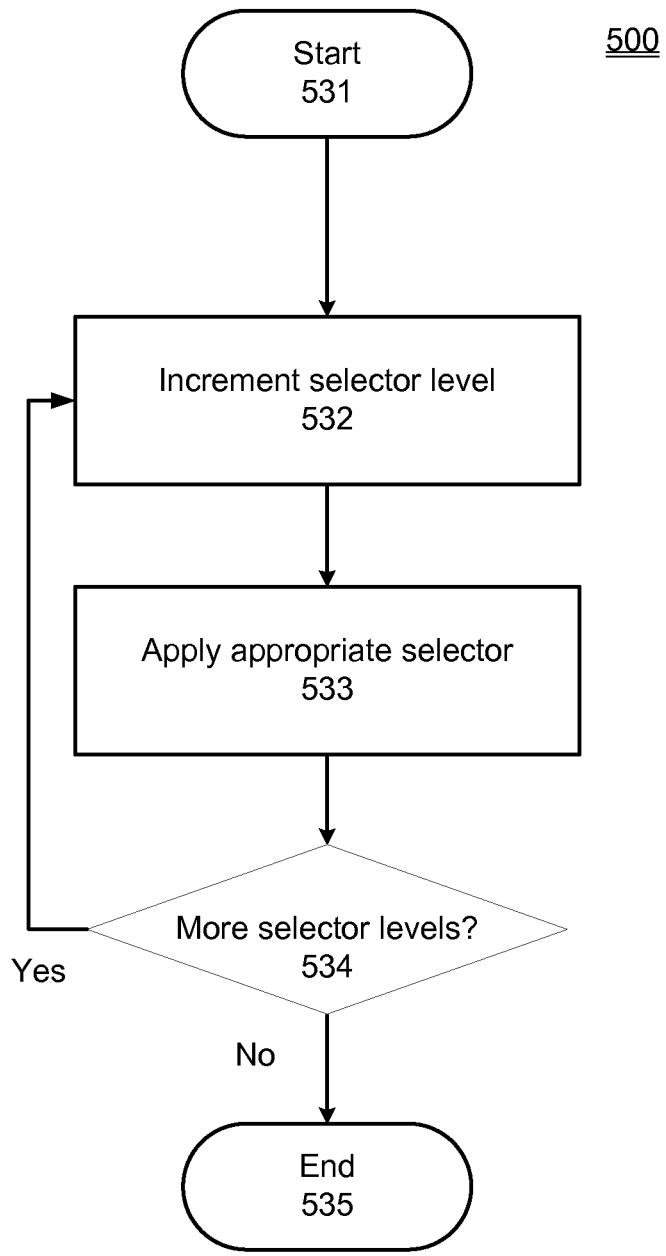
FIG. 5 is a flow chart illustrating in further detail the selector processing step of FIG. 3.

FIG. 5 illustrates an exemplary process 500 for dynamic selector processing (e.g., as in step 330 of FIG. 3) in one embodiment. After the process 500 is invoked in step 531, a selector level is incremented in step 532, for instance to choose the selector O:nth-child(2n+1) {display:none;} as discussed above. In step 533, that selector is applied as the active selector for processing the current portion of HTML data. If there are more selector levels to process, such as O:nth-child(4n+3) {display:inline;} in the example discussed above, then in step 534 processing is returned to step 532; otherwise processing ends in step 535.

Figure 6:
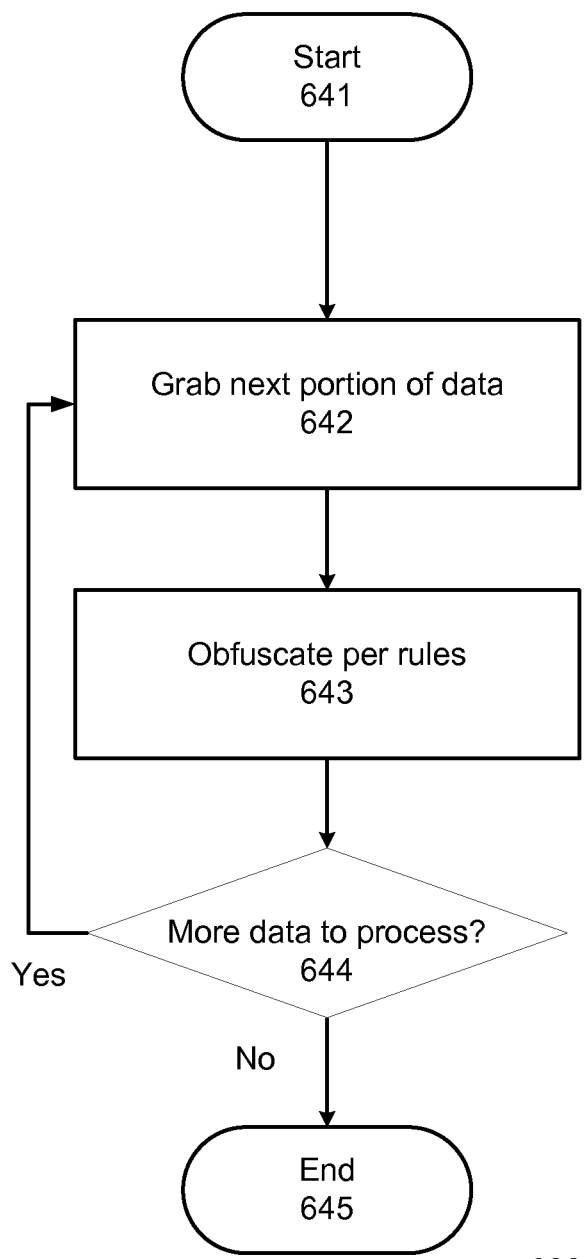
FIG. 6 is a flow chart illustrating in further detail the obfuscation step of FIG. 3.

FIG. 6 illustrates an exemplary process 600 for obfuscation processing (e.g., as in step 340 of FIG. 3) in one embodiment. After the process 600 is invoked in step 641, the next portion of data to be subject to obfuscation processing is grabbed in step 642, and per the currently applicable rules as discussed above, the content data are obfuscated in step 643. If there are more data to process, then in step 644 processing is returned to step 642; otherwise processing ends in step 645.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for protecting an electronic book from unauthorized access through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for protecting electronic book content data from unauthorized access by a user of a computer on which the content data are processed, the method comprising:
    shredding the content data by dividing the content data into a plurality of sections; and
    obfuscating, by a processor, the content data by interspersing plural portions of decoy data among the plurality of sections in a manner not evident to the user.

2. The method of claim 1, wherein said obfuscating results in protected content data that comprises:
    a plurality of segments, each segment comprising one of said sections of content data or one of said portions of decoy data; and
    an indication of which of the segments comprise content data.

3. The method of claim 1, wherein the content data are stored in an HTML format and wherein the shredding comprises adding HTML tags to define the plurality of sections.

4. The method of claim 1, wherein the manner comprises applying selectors implemented using dynamically generated cascading style sheets.

5. The method of claim 1, wherein the manner comprises applying selectors implemented by processing JavaScript so as to generate randomized cascading style sheets.

6. The method of claim 2, wherein the indication comprises a plurality of nested functions that are applied sequentially, each function flipping a subset of bits in a bitmap that indicates which segments correspond to content data.

7. The method of claim 1, wherein the result of said obfuscating is HTML code that is capable of being processed correctly by a target browser and is not capable of being processed correctly by a target scraper.

8. A system protecting electronic book content data from unauthorized access by a user of a computer on which the content data are processed, the system comprising:
    a shredding module configured to divide the content data into a plurality of sections; and
    an obfuscation module configured to intersperse plural portions of decoy data among the plurality of sections in a manner not evident to the user but in accordance with processing used for authorized access by the user.

9. The system of claim 8, wherein the output of said obfuscation module protected content data that comprises:
    a plurality of segments, each segment comprising one of said sections of content data or one of said portions of decoy data; and
    an indication of which of the segments comprise content data.

10. The system of claim 8, wherein the content data are stored in an HTML format and wherein the shredding module is configured to add HTML tags to define the plurality of sections.

11. The system of claim 8, wherein the obfuscation module is configured to implement the manner via dynamically generated cascading style sheets.

12. The system of claim 8, further comprising a JavaScript module in communication with the obfuscation module, the JavaScript module being configured to implement the manner by generation of randomized cascading style sheets using JavaScript.

13. The system of claim 9, wherein the indication comprises a plurality of nested functions that are applied sequentially, each function flipping a subset of bits in a bitmap that indicates which segments correspond to content data.

14. The system of claim 8, wherein the obfuscation module is further configured to provide as output HTML code that is capable of being processed correctly by a target browser processor operating on the computer and is not capable of being processed correctly by a target scraper processor operating on the computer.

15. A non-transitory computer readable medium configured to store instructions for protecting electronic book content data from unauthorized access by a user of a computer on which the content data are processed, the instructions when executed by a processor cause the processor to:
    shred the content data by dividing the content data into a plurality of sections; and
    obfuscate the content data by interspersing plural portions of decoy data among the plurality of sections in a manner not evident to the user.

16. The computer readable medium of claim 15, wherein said obfuscating results in protected content data that comprises:
    a plurality of segments, each segment comprising one of said sections of content data or one of said portions of decoy data; and
    an indication of which of the segments comprise content data.

17. The computer readable medium of claim 15, wherein the content data are stored in an HTML format and wherein the instructions to shred comprise instructions to add HTML tags to define the plurality of sections.

18. The computer readable medium of claim 15, wherein the manner comprises selectors implemented using dynamically generated cascading style sheets.

19. The computer readable medium of claim 15, wherein the manner comprises applying selectors implemented by processing JavaScript so as to generate randomized cascading style sheets.

20. The computer readable medium of claim 16, wherein the indication comprises a plurality of nested functions that are applied sequentially, each function flipping a subset of bits in a bitmap that indicates which segments correspond to content data.

21. The method of claim 2, wherein the indication of which of the segments comprise content data indicates the segments that comprise content data by identifying the segments that comprise decoy data.

22. The system of claim 9, wherein the indication of which of the segments comprise content data indicates the segments that comprise content data by identifying the segments that comprise decoy data.

23. The computer readable medium of claim 16, wherein the indication of which of the segments comprise content data indicates the segments that comprise content data by identifying the segments that comprise decoy data.

* * * * *